W. R. & H. A. BARR.
PRUNING SHEARS.
APPLICATION FILED AUG. 26, 1914.
1,136,759.
Patented Apr. 20, 1915.
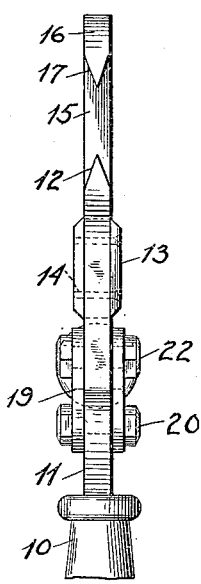
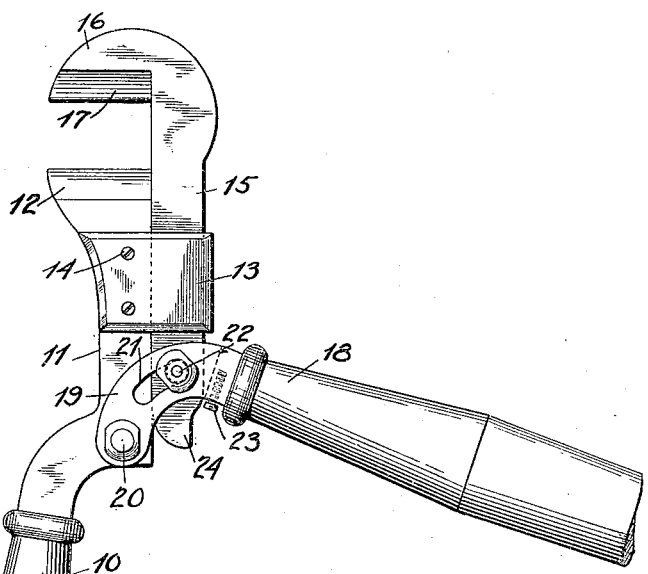
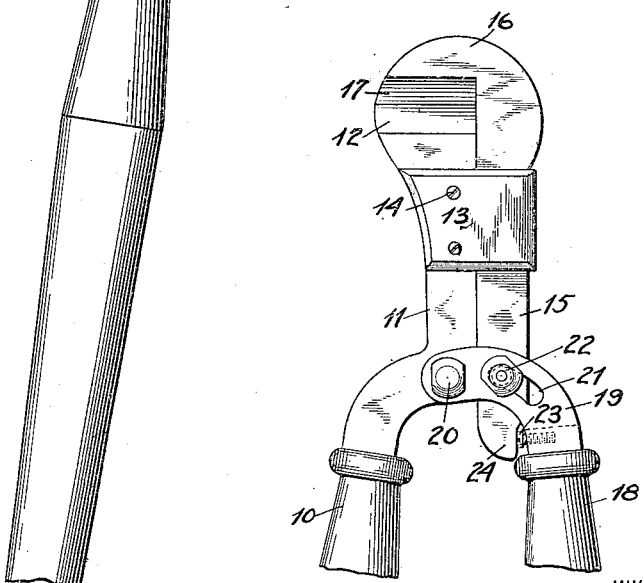
WITNESSES
INVENTORS
William R. Barr
Hugh A. Barr
BY
ATTORNEY

UNITED STATES PATENT OFFICE.

WILLIAM ROBINSON BARR AND HUGH ALBERT BARR, OF OAKLAND, CALIFORNIA.

PRUNING-SHEARS.

1,136,759.   Specification of Letters Patent.   Patented Apr. 20, 1915.

Application filed August 26, 1914. Serial No. 858,630.

*To all whom it may concern:*

Be it known that we, WILLIAM R. BARR and HUGH A. BARR, both citizens of the United States, and residents of Oakland, in the county of Alameda and State of California, have invented new and useful Improvements in Pruning-Shears, of which the following is a full, clear, and exact description.

Our invention relates to shears adapted to be employed for pruning the limbs of trees, the branches of bushes, or vines, and objects of the invention are to provide an improved arrangement of relatively movable blades whereby the force exerted by the user will be most effectively applied; to provide blades and operating means that will result in a clean, smooth cut without bruising the bark or injuring the pruned member, and to provide blades that may be sharpened with the greatest facility.

The invention will be particularly explained in the specific description following.

Reference is to be had to the accompanying drawings forming a part of this specification, in which similar characters of reference indicate corresponding parts in all the views.

Figure 1 is a side elevation of pruning shears embodying our invention, with the blades separated; Fig. 2 is a front edge view; and Fig. 3 is a side elevation with the blades closed.

In constructing a practical embodiment of the invention in accordance with the illustrated example, an elongated handle 10 is employed, having in fixed relation thereto the shank 11 of a knife 12. The said knife 12 ranges transversely to the general direction of the handle, and forms the forward terminal of the shank 11.

A keeper 13 is secured to the shank 11 by screws 14 or equivalent fastening means, in which keeper the shank 15 of a second cutter has sliding movement parallel with the shank 11. The shank 15 has a lateral extension 16 in front of the knife 12, the said extension being formed with a knife edge 17 at the rear edge. The knife edge 17 is thus disposed transversely to the shank 15, at a side of the latter, and parallel with the knife 12. Both the knives 12, 17, are beveled opposed sides toward the center so that the cutting edges will come together in the median line of the knives. The knives will thus make an effective, clean, straight cut, without bruising the pruned member, whereby the healing of the member will proceed more quickly.

In order to give relative movement to the knives toward and from each other, a handle 18 has in fixed relation thereto at the forward end, an arcuate plate 19, the end of which is pivoted as at 20, to the shank 11. Operative connection between the handle 18 and the shank 15 of the second knife is effected by an arcuate slot 21 in the plate 19 and a pin or bolt 22 which is carried by the shank 15 and extends through the slot 21.

It will be clear that a relative movement of the handles 10, 18, will serve to give a relative sliding movement to the shanks 11, 15, whereby the knives 12, 17, are brought toward and from each other as desired, to effect a cutting movement and separate the blades after the cutting movement. To limit the movements of the handles toward each other one handle, 18, is provided with a screw 23, which is adapted to contact with the side edge of an extension 24 on the shank 15 rearward of the slot and pin connection. The screw 23 may be adjusted to regulate the approach of the knives 12 and 17 and after the knives have been sharpened the adjustment of the screw may be regulated to conform to the altered relation of the knives due to the sharpening.

The form and construction are characterized by simplicity and convenience of adjustment, and the force exerted by the operator is very effectively applied to make a clean, smooth cut. Moreover, the straight transverse knives may be sharpened with facility.

Having thus described our invention, we claim as new and desire to secure by Letters Patent:

1. A pruning shears comprising a handle, a knife having the shank thereof in fixed relation to said handle, the shank terminating in a straight transverse knife, a second shank slidable in a direction parallel to the first shank, a guide member for the second shank, said guide member being in fixed relation to the first shank, a lateral extension on the second shank formed at the rear side thereof with a knife edge, the second knife edge being disposed in front of the first knife and parallel with the latter, a second handle having an element in fixed relation thereto at the forward end, said element being pivoted to the shank of the first knife and formed with an arcuate slot rearward of the pivot, and a pin extending through the arcuate slot and secured to the second shank.

2. In a pruning shears, a handled member, a transverse knife in fixed relation to the said member, at the forward end, a second knife disposed transversely in front of the first knife and parallel therewith, the shank of the second knife having sliding movement parallel with the said handled member, means on the said handled member for giving guided movement to the shank of the second knife, and a second handled member pivoted at its forward end to the first handled member and operatively connected with the shank of the second knife.

3. A pruning shears, comprising a handle, a rigid shank extending forward at the front end of the handle and formed with a transverse straight knife edge, a second shank slidable on the first shank, and having a lateral extension formed with a knife at the edge opposed to the first knife and parallel with the latter, a keeper on the first shank in which the second shank has guided movement, a second handle having at its forward end a rigid arcuate plate, said plate being pivoted to the first shank and having an arcuate slot, a transverse pin extending from the second shaft through the said slot, and an adjustable screw stop in the arcuate plate at the inner side, the rear end of the second shank presenting an extension through the edge of which the said screw is adapted to contact to limit the upward movements of the handle.

In testimony whereof we have signed our names to this specification in the presence of two subscribing witnesses.

WILLIAM ROBINSON BARR.
HUGH ALBERT BARR.

Witnesses:
KATHARINE L. SCOTT,
S. BACHRACH.

Copies of this patent may be obtained for five cents each, by addressing the "Commissioner of Patents, Washington, D. C."